(12) United States Patent
Bergh

(10) Patent No.: US 11,236,757 B2
(45) Date of Patent: Feb. 1, 2022

(54) PUMP FOR PUMPING LIQUID AS WELL AS IMPELLER ASSEMBLY

(71) Applicant: Xylem IP Management S.à r.l., Senningerberg (LU)

(72) Inventor: Stefan Bergh, Lindås (SE)

(73) Assignee: Xylem Europe GmbH

( * ) Notice: Subject to any disclaimer, the term of this patent is extended or adjusted under 35 U.S.C. 154(b) by 547 days.

(21) Appl. No.: 16/301,841

(22) PCT Filed: May 10, 2017

(86) PCT No.: PCT/EP2017/061137
§ 371 (c)(1),
(2) Date: Nov. 15, 2018

(87) PCT Pub. No.: WO2017/198509
PCT Pub. Date: Nov. 23, 2017

(65) Prior Publication Data
US 2019/0154047 A1    May 23, 2019

(30) Foreign Application Priority Data

May 17, 2016  (EP) ..................................... 16169846

(51) Int. Cl.
*F04D 29/042* (2006.01)
*F04D 7/04* (2006.01)
(Continued)

(52) U.S. Cl.
CPC ........... *F04D 29/042* (2013.01); *F04D 7/045* (2013.01); *F04D 13/08* (2013.01); *F04D 15/0033* (2013.01); *F16D 1/097* (2013.01)

(58) Field of Classification Search
CPC .......... F04D 7/04; F04D 7/045; F04D 29/042; F04D 15/033; F04D 13/08; F16D 1/097
See application file for complete search history.

(56) References Cited

U.S. PATENT DOCUMENTS

| 4,130,374 A | 12/1978 | Bingler |
| 4,752,183 A * | 6/1988 | Sakurai ................. F04D 29/042 415/12 |

(Continued)

FOREIGN PATENT DOCUMENTS

| CN | 101371046 A | 2/2009 |
| EP | 1899609 B1 | 11/2010 |

(Continued)

OTHER PUBLICATIONS

Chinese Office Action for Chinese Application No. 201780030281.7, dated Apr. 22, 2020 with translation, 15 pages.

(Continued)

*Primary Examiner* — Kenneth Bomberg
*Assistant Examiner* — Julian B Getachew
(74) *Attorney, Agent, or Firm* — RatnerPrestia

(57) ABSTRACT

A pump for pumping a liquid, includes an impeller and an axially extending drive shaft assembly, wherein a distal end of the drive shaft assembly is received in a central recess of the impeller. The drive shaft assembly includes a drive shaft and a connector. The connector includes a sleeve that is in telescopic engagement with the drive shaft. During operation of the pump the impeller is displaceable in the axial direction in relation to the sleeve between a distal rest position and a proximal position. The impeller is biased towards the distal rest position by a spring member arranged between the sleeve and the impeller. The connector includes a hollow adjustment screw that is in threaded engagement with an interior side of the sleeve to limit the maximum degree of telescopic overlap between the sleeve and the drive shaft.

9 Claims, 3 Drawing Sheets

(51) Int. Cl.
    *F04D 13/08*     (2006.01)
    *F04D 15/00*     (2006.01)
    *F16D 1/097*     (2006.01)

(56) References Cited

U.S. PATENT DOCUMENTS

| | | |
|---|---|---|
| 6,305,906 B1 | 10/2001 | Ekstrom |
| 8,197,192 B2 | 6/2012 | Andersson |

FOREIGN PATENT DOCUMENTS

| | | |
|---|---|---|
| WO | 2007004943 A1 | 1/2007 |
| WO | 2008039143 A1 | 4/2008 |
| WO | 2013050956 A2 | 4/2013 |
| WO | 2015022601 A1 | 2/2015 |

OTHER PUBLICATIONS

International Search Report and Written Opinion for International Application No. PCT/EP2017/061137, dated Jul. 31, 2017—8 pages.

\* cited by examiner

PUMP FOR PUMPING LIQUID AS WELL AS IMPELLER ASSEMBLY

CROSS-REFERENCE TO RELATED APPLICATIONS

This patent application is a U.S. National Phase Patent Application of PCT Application No.: PCT/EP2017/061137, filed May 10, 2017, which claims priority to European Patent Application No. 16169846.9, filed May 17, 2016, each of which is incorporated by reference herein in its entirety.

TECHNICAL FIELD OF THE INVENTION

The present invention relates, in general, to the technical field of pumps for pumping liquid, and in particular to the technical field of pumps for pumping liquid comprising solid matter, such as sewage/wastewater which may comprise polymers, hygiene articles, fabrics, rags, etc.

In accordance with a first aspect, the present invention relates to a pump for pumping liquid, comprising an impeller and an axially extending drive shaft assembly, wherein a distal end of the drive shaft assembly is received in a central recess of the impeller, the drive shaft assembly comprising a drive shaft and a connector, wherein the connector comprises a sleeve that is in telescopic engagement with the drive shaft, the impeller during operation of the pump being displaceable in the axial direction in relation to said sleeve between a distal rest position and a proximal position. It shall be pointed out that the terms distal and proximal shall be considered in relation to the center of the drive shaft seen in the axial direction of the drive shaft.

In accordance with a second aspect, the present invention relates to an impeller assembly configured to be installed in a pump chamber of a pump suitable for pumping liquid comprising solid matter.

BACKGROUND OF THE INVENTION

In plants such as sewage treatment plants, septic tanks, wells, pump stations, etc., it occurs that solid matter/contaminations such as socks, sanitary towels, papers, etc. obstruct the pump, for example a submersible pump that is submerged in the basin/receptacle of the plant/station.

When the impeller and the impeller seat are positioned at a fixed distance from each other, the pollutants are sometimes too large to pass through the pump. Large pieces of solid matter may in worst case cause the impeller to wedge, thus seriously damaging the pump. Such an unintentional shutdown is costly since it entails expensive, tedious and unplanned maintenance work.

European patent EP 1899609 discloses a pump that comprises an impeller that is arranged to rotate in a pump housing, said impeller being suspended by a drive shaft, and an impeller seat. The impeller is movable in the axial direction in relation to the impeller seat during operation of the pump in order to allow larger pieces of solid matter to pass through, pieces that otherwise would block the pump or wedge the impeller.

International patent application WO 2015/022601 discloses a similar pump and thereto comprises a connector arranged between the drive shaft and the impeller, wherein the connector is received in a central recess of the impeller and comprises a sleeve that, is in telescopic engagement with the drive shaft. In WO 2015/022601 the impeller has a defined distal/lower rest position in relation to the connector that entails that adjustment of an axial gap between the impeller and the suction cover of the pump may be performed. When the impeller is in the distal rest position, an annular spring member that is arranged in an annular recess of the impeller snaps into an annular groove of the sleeve, in order to secure the impeller in said distal rest position. During mounting and during adjustment/trimming of the axial gap between the impeller and the suction cover the annular spring may snap out of the annular groove in the sleeve. If this happens during adjustment of the axial gap, the entire mounting of the impeller has to be restarted in order to secure that the impeller is located in the distal rest position in relation to the connector. Thereto the mounting and adjustment/trimming of the impeller has to be performed from underneath the pump, i.e. having the pump upright with the drive shaft vertically oriented, the pump inlet facing downwards and the impeller suspended by the lower end of the drive shaft.

It should also be mentioned that submersible pumps of the above kind are used to pump liquid from basins that are difficult to reach for maintenance and that the pumps often operate for 12 or more hours daily. It is therefore utterly desirable to provide a pump with long working life.

OBJECT OF THE INVENTION

The present invention aims at obviating the above-mentioned disadvantages and failings of the previously known pumps and to provide an improved pump. A primary object of the invention is to provide an improved pump and impeller assembly of the type defined in the introduction, wherein the impeller has a well-defined distal rest position that allows adjustment of the axial gap between the impeller and the suction cover of the pump to be performed with great precision.

A further object of the present invention is to provide a pump and an impeller assembly, wherein the mounting and adjustment/trimming of the impeller can be performed having the pump upside-down, i.e. having the pump with the drive shaft vertically oriented and the impeller facing upwards, without the risk that the impeller leaves the distal rest position.

A further object of the present invention is to provide a pump and an impeller assembly, wherein the impeller doesn't run the risk of becoming tilted as a consequence of asymmetrically applied force acting in the axial direction against the impeller.

It is also an object of the present invention to provide an improved pump of the type defined in the introduction, wherein said pump in a reliable manner allows large pieces of solid matter to pass through the pump.

SUMMARY OF THE INVENTION

According to the invention at least the primary object is attained by means of the initially defined pump and impeller assembly having the features defined in the independent claims. Preferred embodiments of the present invention are further defined in the dependent claims.

According to a first aspect of the present invention, there is provided a pump of the initially defined type, which is characterized in that the impeller is biased towards the distal rest position by means of a spring member arranged between the sleeve and the impeller, the connector comprising a hollow adjustment screw that is in threaded engagement with an interior side of the sleeve and configured to limit the maximum degree of telescopic overlap between the sleeve and the drive shaft, wherein an impeller screw extends through the adjustment screw and is in threaded engagement with the drive shaft in order to press the adjustment screw towards the drive shaft.

Thus, the present invention is based on the understanding that a combination of an adjustment screw defining the degree of telescopic engagement with the drive shaft and a spring member biasing the impeller towards the distal rest position, the mounting and adjustment/trimming of an axially displaceable impeller can be performed with great precision.

According to a preferred embodiment of the present invention, the distal/free end of the drive shaft has the shape of a truncated cone and the pump comprises a socket, the socket being wedged between the interior side of the sleeve of the connector and the distal end of the drive shaft.

According to a preferred embodiment, the hub of the impeller comprises a through hole extending in the axial direction, and wherein the sleeve is arranged in said through hole of the impeller, and wherein a gap is arranged between a distal end of the sleeve and the hub of the impeller, said gap being adjacent a cavity that houses said spring member.

According to a second aspect of the present invention, there is provided an impeller assembly configured for a pump suitable for pumping liquid comprising solid matter. The impeller assembly entails that the connector may be pre-mounted into the central recess of the impeller before mounting of the impeller assembly into the pump, whereby the impeller assembly may also be sold as an up-grading kit for existing pumps having axially displaceable impeller.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

Figure 1:
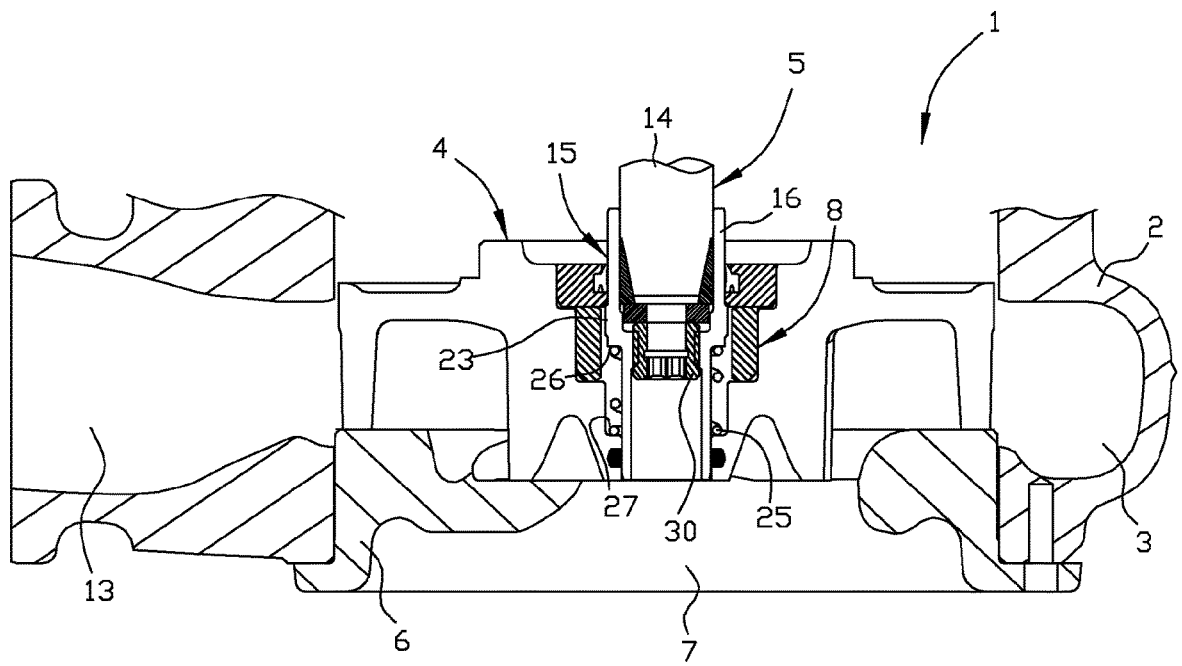
FIG. 1 is a schematic cross sectional side view of a hydraulic unit of a centrifugal pump, wherein the impeller is located in the distal rest position.
Figure 2:
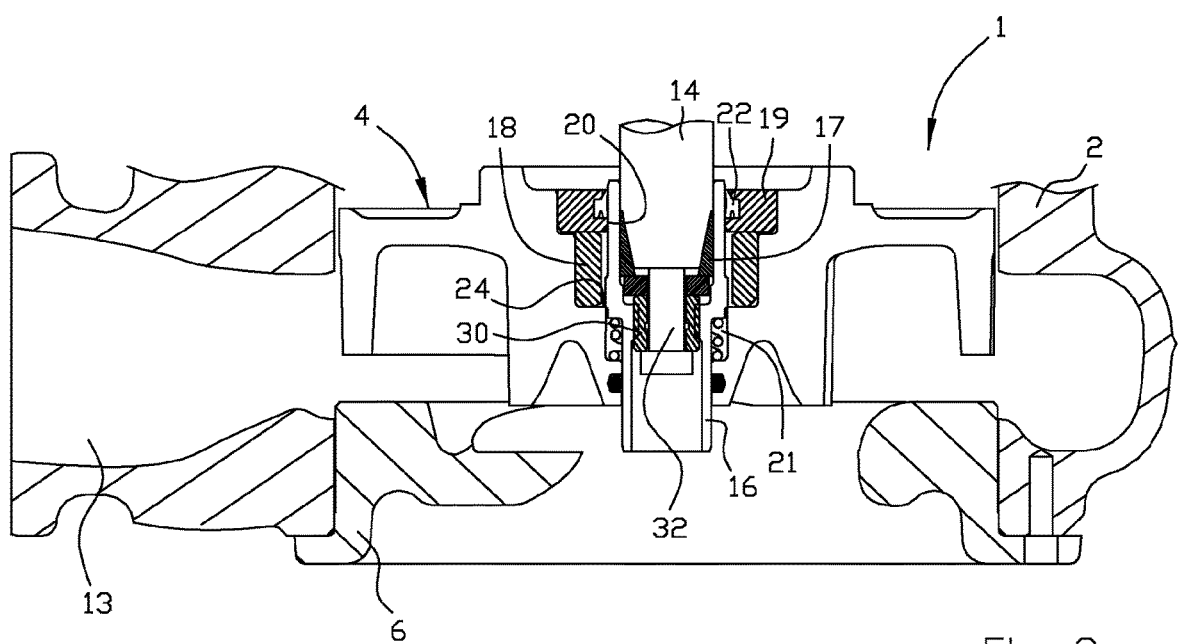
FIG. 2 is a schematic cross sectional side view of the hydraulic unit according to FIG. 1, wherein the impeller is located in the proximal position.

Reference is made to FIGS. 1 and 2, which discloses a part of an inventive pump, generally designated 1, more specifically the hydraulic unit thereof. In FIGS. 1 and 2, any other parts of the pump 1 are removed for the sake of clarity. These parts are inter alia a drive unit comprising principally an electric motor, and a sealing unit arranged between the hydraulic unit and the drive unit. The sealing unit is configured to prevent the pumped liquid to enter the drive unit.

Figure 3:
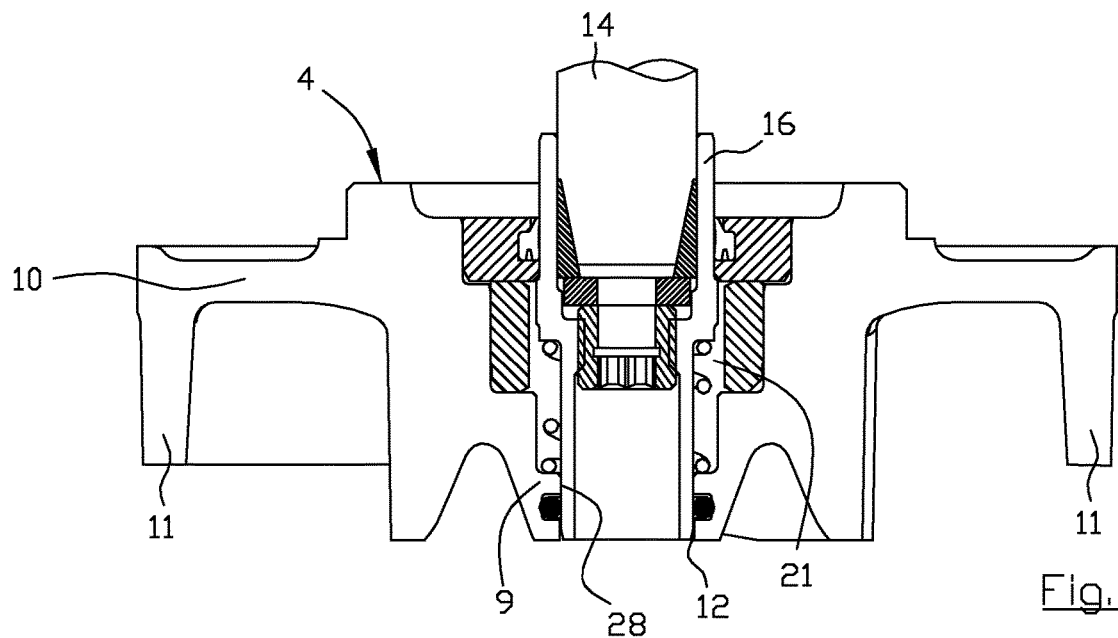
FIG. 3 is schematic cross sectional side view of an inventive impeller assembly connected to a drive shaft, wherein the impeller is located in the distal rest position.
Figure 4:
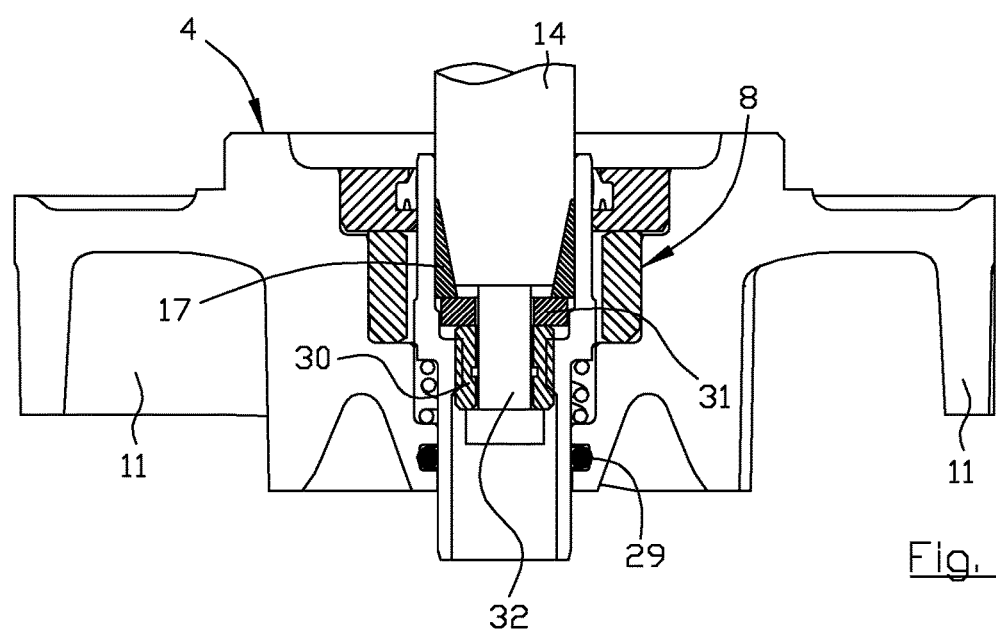
FIG. 4 is schematic cross sectional side view of the impeller assembly according to FIG. 3, wherein the impeller is located in the proximal position.

Reference is also made to FIGS. 3 and 4, which disclose an inventive impeller assembly connected to a drive shaft.

The present invention relates in general to pumps for pumping liquid, but in the preferred embodiment the pump is constituted by a submersible centrifugal pump suitable for pumping liquid comprising solid matter, such as wastewater, sewage, etc. The present invention will be described in combination with such a pump, without in any way being limited thereto.

The hydraulic unit, and thereby the pump 1, comprises a pump housing or volute 2 that delimits a pump chamber 3, an impeller 4 arranged to rotate in said pump chamber 3, the impeller 4 being suspended in a distal/free end of an axially extending drive shaft assembly 5, and a suction cover 6 having a centrally located inlet opening 7 for incoming/influent liquid flow. The distal end of the drive shaft assembly 5 is received in a central recess 8 of the impeller 4.

In the disclosed embodiments the impeller 4 is an open impeller comprising a hub 9, an upper cover disc 10 and at least one blade 11 connected to said upper cover disc 10. The at least one blade 11 is preferably connected also to the hub 9. The hub 9 of the impeller 4 comprises said central recess 8 and a through hole 12 extending in the axial direction between the central recess 8 and the distal/lower end of the impeller/hub.

The suction cover 6, also known as impeller seat or insert ring, is preferably releasably connected to the pump housing 2, e.g. by means of a plurality of bolts or the like, in such a way that the suction cover 6 cannot rotate/move relative the pump housing 2. During operation of the pump 1 the impeller 4 is driven in rotation by the drive shaft assembly 5, in order for the impeller 4 to pump/transport the liquid surrounding the pump 1. Furthermore, the pump housing 2 comprises an outlet opening 13 for outgoing liquid flow, said outlet opening 13' being radially directed in the shown embodiment, and the outlet opening 13 being arranged to be connected to a suitable outlet pipe (not disclosed).

According to the invention, the drive shaft assembly 5 comprises a drive shaft 14 and a connector 15. The connector 15 is arranged between the drive shaft 14 and the impeller 4, and is configured to interconnect the drive shaft 14 and the impeller 4.

It shall be pointed out that the distal end of the drive shaft assembly 5 is the lower end of the drive shaft assembly 5 when the pump 1 is oriented up-right having the drive shaft 14 vertically oriented and the impeller 4 and the inlet opening 7 facing downwards.

The connector 15 comprises a sleeve 16 that is in telescopic engagement with the drive shaft 14, i.e. the drive shaft 14 is inserted into the sleeve 16 and/or the sleeve 16 is fitted onto the drive shaft 14. During operation of the pump 1, the impeller 4 is displaceable in the axial direction in relation to said sleeve 16 between a distal/lower rest position (shown in FIGS. 1 and 3) and a proximal/upper position (shown in FIGS. 2 and 4). Thus, when the impeller 4 is displaced from the distal rest position, i.e. adjacent the suction cover 6, the impeller 4 is displaced in direction away from the suction cover 6 and towards the proximal position, i.e. distanced from the suction cover 6, in order to allow big pieces of solid matter present in the pumped liquid to pass the impeller 4 and the pump volute 2. It shall be realized that if the solid matter is only medium sized, the impeller 4 must not necessarily be displaced all the way to the disclosed proximal position.

During operation of the pump 1, the sleeve 16 is fixed in relation to the drive shaft 14. However, it is important that the sleeve 16 is releasably connected to the drive shaft 14 to be able to adjust the telescopic overlap between the sleeve 16 and the drive shaft 14.

In the disclosed embodiment, the sleeve 16 is connected to the drive shaft 14 by means of a conventional socket 17, also known as a clamping sleeve. The distal end of the drive shaft 14 is circumferentially chamfered, i.e. has the shape of a truncated cone, and the socket 17 is configured to be wedged between the interior side of the sleeve 16 of the connector 15 and the distal end of the drive shaft 14. The interior side of the sleeve 16 is preferably cylindrical. When an axially applied force have effect against the socket 17, the socket 17 is pressed onto the drive shaft 14 in the axial direction and at the same time the socket 17 is widened radially outwards such that the sleeve 16 is braced/clamped onto the drive shaft 14. Thus, the drive shaft 14 and the sleeve 16 are jointly rotatable by means of friction during operation of the pump. One great advantage of this embodiment is that the mutual position between the sleeve. 16 and the drive shaft 14, in the axial direction, can be readjusted as will be explained herein below.

The drive shaft assembly 5 and the impeller 4 are jointly rotatable by means of structural means. According to a first embodiment, the structural means are constituted by one or more axially extending rods/pins located at the interface between the central recess 8 of the impeller 4 and the envelope surface of the sleeve 16. Each rod/pin is located in opposite recesses of the impeller 4 and the sleeve 16, respectively. According to a second embodiment, the structural means are constituted by members that are fixedly connected to the sleeve 16, such as protrusions or recesses, which members cooperate with corresponding members that are fixedly connected to the impeller 4. One example of the second embodiment is a spline coupling. According to a third embodiment, the structural means is constituted by the cross sectional shape of the actual interface between the central recess 8 of the impeller. 4 and the envelope surface of the sleeve 16. Thus, said interface, along a radially extending plane, may have a polygonal basic shape, e.g. quadrangular or hexagonal. In other words the sleeve 16 has a quadrangular, or the like, outer shape and the central recess 8 of the impeller 4 has a corresponding inner shape, seen in a radial plane.

In FIGS. 1-4 is disclosed an insert 18 that is considered to be an integral part of the impeller 4. The insert 18 is preferably press fitted into the impeller 4. Thus, in connection with the description of the structural means above, the insert 18 is entirely equivalent with the impeller 4. Irrespective of the design/configuration of the inner surface of the insert 18, the envelope surface of the insert 18 is preferably cylindrical from a manufacturing/casting perspective.

A guide ring 19 is located at the mouth of the central recess 8 of the impeller 4. The guide ring 19 is press fitted into the central recess 8 of the impeller 4, and the envelope surface of the guide ring 19 is preferably cylindrical. The inner surface of the guide ring 19 is arranged in close fit with the outer surface of the sleeve 16, in order to guide the impeller 4 when it is displaced in relation to the sleeve 16. Thus, an upper gap 20 is provided between the guide ring 19 and the sleeve 16, and delimits a cavity 21 in the hub 9 of the impeller 4. A seal 22 is arranged in the upper gap 20 between the sleeve 16 and the guide ring 19, in order to prevent any solid matter in the pumped liquid from passing through the gap 20 between the guide ring 19 and the sleeve 16 into the cavity 21.

The sleeve 16 comprises at least one radial projection 23, preferably a circumferential projection, that is arranged to abut the guide ring 19 when the impeller 4 is located at the distal rest position. Thus, the impeller 4 has a well defined distal rest position in relation to the sleeve 16. When the impeller 4 is located at the proximal position, the projection 23 of the sleeve 16 preferably abut a stop surface 24 of the impeller 4.

According to the invention the impeller 4 is biased towards the distal rest position by means of a spring member 25 arranged between the sleeve 16 and the impeller 4. The spring member 25 is preferably arranged on the outside of the sleeve 16. In the disclosed embodiment the distal/lower portion of the sleeve 16 presents a smaller diameter than the proximal/upper portion of the sleeve 16, wherein an abutment surface 26 is provided at the transition between the narrow distal portion and the thick proximal portion of the sleeve 16. The spring member 25, which is preferably constituted by a helical spring, is arranged between the abutment surface 26 of the sleeve 16 and a bottom surface 27 of the central recess 8 of the impeller 4.

The sleeve 16, i.e. the distal portion of the sleeve 16, is arranged in said through hole 12 in close fit, wherein a lower gap 28 is arranged between the distal portion of the sleeve 16 and the hub 9. The cavity 21 is delimited by the upper gap 20 and the lower gap 28, wherein the spring member 25 is arranged in said cavity 21. A seal 29 is arranged at the lower gap 28, in order to prevent any solid matter in the pumped liquid from entering said cavity 21. The seal 29 is preferably arranged in a circumferential groove in the through hole 12 of the impeller 4.

When the impeller 4 is located at the distal rest position in relation to the sleeve 16, the end surface of the sleeve 16 is preferably in flush with the distal end of the hub 9 of the impeller 4.

It is essential for the invention that the connector 15 comprises a hollow adjustment screw 30 that is in threaded engagement with an interior side of the sleeve 16. The adjustment screw 30 is configured to limit the maximum degree of telescopic overlap between the sleeve 16 and the drive shaft 14.

The adjustment screw 30 acts directly or indirectly against the socket 17. In the disclosed embodiment a washer 31 is arranged between the adjustment screw 30 and the socket 17. The adjustment screw 30, or the washer 31, is not allowed to contact the end surface of the drive shaft 14. Thus, when the adjustment screw 30 is tightened the sleeve 16 will be displaced in the distal direction in relation to the drive shaft 14 and when the adjustment screw 30 is loosen the sleeve 16 will be displaced in the proximal direction in relation to the drive shaft 14. During adjustment/trimming the pump 1 is located up-side down.

During adjustment/trimming of the axial gap between the impeller 4 and the impeller seat 6, the adjustment screw 30 is tighten until the impeller 4 abuts the impeller seat 6. In practice the adjustment screw 30 is tighten using a predetermined torque. The head of an impeller screw 32 act against the adjustment screw 30, direct or indirect via a washer, and the stem of the impeller screw 32 extends through the adjustment screw 30 and into threaded engagement with the drive shaft 14. When the impeller screw 32 is tightened, the adjustment screw 30 will be pressed/displaced in the proximal direction and the socket 17 will be pressed onto the drive shaft 14. In practice the impeller screw 32 is tighten using a predetermined torque, providing a well defined axial gap between the impeller 4 and the impeller seat 6.

Figure 5:
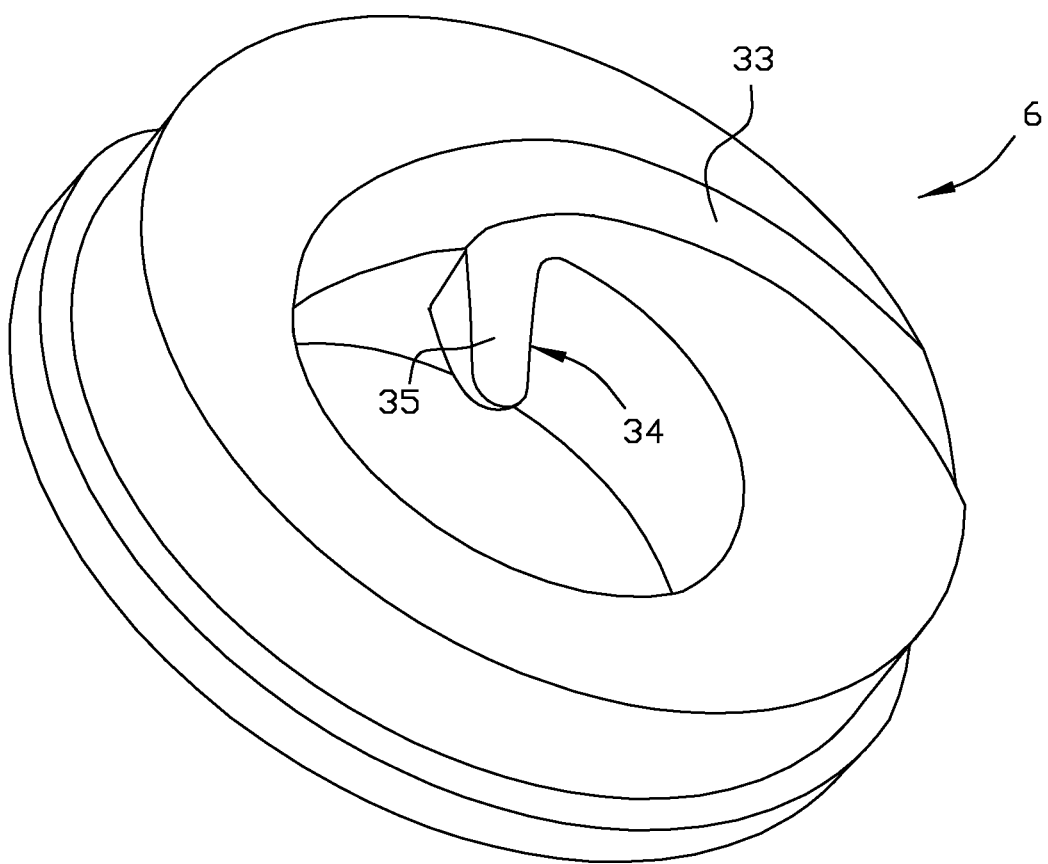
FIG. 5 is a schematic perspective view of an impeller seat.

Reference is now made to FIG. 5 disclosing an embodiment of a suction cover 6.

At least one groove or clearance groove 33 is arranged in the upper surface of the suction cover 6 and the adjoining inlet 7 of the pump chamber 3. The groove 33 extends from the inlet 7 of the suction cover 6 towards the periphery thereof. The groove 33 is preferably spiral-shaped and sweeps outwardly in the rotational direction of the impeller 4. The number of grooves 33 and their shape and orientation may vary significantly so as to fit different liquids and fields of application. The function of the groove 33 is to guide the solid matter in the pumped liquid outwardly, towards the periphery of the pump housing 2. Some of the solid matter passing through the pump will get stuck underneath the blades 11 of the impeller 4 and reduce the rotational speed of the impeller, sometimes even downright completely stop its movement. The groove 33 contributes in keeping the blades 11 clean by scraping off the solid matter each time the blade 11 passes said groove 33. If the solid mater is too large to fit into the groove 33, i.e. between the impeller 4 and the suction cover 6, or to be scraped off, the impeller 4 will, by means of the solid matter itself, be displaced upwards and away from the suction cover 6 thereby allowing the solid matter to pass through the pump.

The shape of the lower edge of the blade 11 corresponds in the axial direction to the shape of the upper surface of the suction cover 6. The axial distance between said lower edge and said upper surface should be less than 1 mm when the impeller 4 is in the distal rest position. Said distance is preferably less than 0.8 mm and most preferred less than 0.5 mm. Said distance should at the same time be greater than 0.1 mm and preferably greater than 0.2 mm. If the impeller 4 and the suction cover 6 are too close to each other, than a friction force or a braking force acts on the blade 11 of the impeller 4.

In order to ensure that the inlet 7 of the pump doesn't become obstructed, the suction cover 6 is preferably provided with means that guide the solid matter towards the groove 33. The guiding means comprise at least a guide pin 34 extending from the upper surface of the suction cover 6, more particularly from the section of the upper surface that faces the inlet 7. The guide pin 34 generally extends in the radial direction of the suction cover 6 and is positioned below the impeller and has an upper surface 35 that extends from a position adjoining the innermost part of the blade 11 of the impeller 4 towards or to the upper surface of the suction cover 6. More specifically, the innermost part of the upper surface 35 of the guide pin 34 is placed at approximately the same radial distance from the hub 9 of the impeller 4 as the innermost part of the blade 11 of the impeller 4. The upper surface 35 of the guide pin 34 preferably ends in immediate proximity of the "inlet" of said groove 33. When the impeller 4 is in the lower position, the axial distance between the upper surface 35 of the guide pin 34 and the leading edge of the blade 11 should be less than 1 mm.

The present invention also relates to an impeller assembly to be arranged in a pump chamber 3. Such an impeller assembly may be sold as an up-grading kit for a pump with axially displaceable impeller, said pump belonging to the prior art. The impeller assembly comprises an impeller 4 with a central recess 8 and a connector 15. The connector 15 is received in said central recess 8, wherein the sleeve 16 of the connector 15 is arranged to be connected to an axially extending drive shaft 14. The impeller 4 is displaceable back and forth in the axial direction in relation to the sleeve 16 between a distal rest position and a proximal position. In addition, everything that has been mentioned as regards the connector 15, sleeve 16 and the impeller 4 is applicable to the impeller assembly as well. In this context, the connector 15 also belongs to the impeller assembly and when the impeller assembly is mounted on the drive shaft 14, the connector 15 belongs to the distal end of the drive shaft unit 5.

FEASIBLE MODIFICATIONS OF THE INVENTION

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A pump for pumping liquid comprising solid matter, said pump comprising an impeller and an axially extending drive shaft assembly, wherein a distal end of the drive shaft assembly is received in a central recess of the impeller, the drive shaft assembly comprising a drive shaft and a connector, wherein the connector comprises a sleeve that is in telescopic engagement with the drive shaft, the impeller being displaceable in an axial direction in relation to said sleeve between a distal rest position and a proximal position during operation of the pump in response to an axial force exerted by solid matter in contact with the impeller, wherein the impeller is biased towards the distal rest position by a spring member arranged between the sleeve and the impeller, the connector further comprising a hollow adjustment screw that is in threaded engagement with an interior side of the sleeve and configured to limit a maximum degree of telescopic overlap between the sleeve and the drive shaft, wherein an impeller screw extends through the adjustment screw and is in threaded engagement with the drive shaft in order to press the adjustment screw towards the drive shaft.

2. The pump according to claim 1, wherein the distal end of the drive shaft has a truncated cone shape and the pump comprises a socket, the socket being wedged between the interior side of the sleeve of the connector and the distal end of the drive shaft.

3. The pump according to claim 2, wherein the adjustment screw is configured to wedge the socket between the interior side of the sleeve of the connector and the distal end of the drive shaft.

4. The pump according to claim 1, wherein the impeller is an open impeller comprising a hub, an upper cover disc and at least one blade connected to said cover disc.

5. The pump according to claim 1, wherein the impeller comprises a hub, said hub comprising a through hole that extends in the axial direction, wherein the sleeve is arranged in said through hole of the impeller, and wherein a gap is arranged between a distal portion of the sleeve and the hub of the impeller, said gap being adjacent a cavity that houses said spring member.

6. The pump according to claim 5, wherein a seal is arranged at the gap, in order to prevent any solid matter in the pump liquid from entering said cavity.

7. The pump according to claim 5, wherein a seal is arranged in a circumferential groove in the through hole of the impeller.

8. An impeller assembly for a pump configured for pumping liquid including solid matter, said impeller assembly comprising an impeller having a central recess and a connector, wherein the connector comprises a sleeve arranged in the central recess of the impeller, wherein the sleeve is configured to be in telescopic engagement with an axially extending drive shaft, the impeller being displaceable in an axial direction in relation to said sleeve between a distal rest position and a proximal position in response to an axial force exerted by solid matter in contact with the impeller, wherein the impeller is biased towards the distal rest position by a spring member arranged between the sleeve and the impeller, the connector further comprising a hollow adjustment screw that is in threaded engagement with an interior side of the sleeve and configured to limit the maximum degree of telescopic overlap between the sleeve and the drive shaft.

9. A pump for pumping liquid comprising solid matter, said pump comprising:

an impeller having a central recess;

an axially extending drive shaft assembly having a distal end configured to be received in the central recess of the impeller, the drive shaft assembly comprising:
  a drive shaft having a distal end with a truncated cone shape;
  a connector comprising a sleeve in telescopic engagement with the drive shaft;
  a hollow adjustment screw in threaded engagement with an interior side of the sleeve and configured to limit a maximum degree of telescopic overlap between the sleeve and the drive shaft; and
  an impeller screw extending through the adjustment screw, in threaded engagement with the drive shaft, and configured to press the adjustment screw towards the drive shaft;

wherein the impeller is displaceable in an axial direction in relation to said sleeve between a distal rest position and a proximal position during operation of the pump, and the pump further comprises:
  a spring member arranged between the sleeve and the impeller, the spring member configured to bias the impeller towards the distal rest position; and
  a socket wedged between the interior side of the sleeve and the distal end of the drive shaft, wherein the adjustment screw is configured to wedge the socket between the interior side of the sleeve and the distal end of the drive shaft.

* * * * *